United States Patent
Durandeau et al.

[11] Patent Number: 5,913,492
[45] Date of Patent: Jun. 22, 1999

[54] SYSTEM FOR CONTROLLING AN AIRCRAFT CONTROL SURFACE TAB

[75] Inventors: Michel Durandeau; Etienne Foch, both of Toulouse, France

[73] Assignee: Aerospatiale Societe Nationale Industrielle, Paris, France

[21] Appl. No.: 08/855,190

[22] Filed: May 13, 1997

[30] Foreign Application Priority Data

May 17, 1996 [FR] France .................................. 96 06144

[51] Int. Cl.⁶ .............................. B64C 9/04; B64C 9/10
[52] U.S. Cl. ......................... 244/82; 244/228; 244/195; 244/76 A
[58] Field of Search ................. 244/76 A, 223, 244/228, 90 B, 194, 195, 82

[56] References Cited

U.S. PATENT DOCUMENTS

| | | | |
|---|---|---|---|
| 2,383,779 | 8/1945 | Dobmeier et al. | 244/82 |
| 2,557,426 | 6/1951 | George | 244/82 |
| 2,563,757 | 8/1951 | Thorp | 244/82 X |
| 2,568,719 | 9/1951 | Curry, Jr. | 244/82 |
| 2,577,439 | 12/1951 | Wendt | 244/82 |
| 2,640,665 | 6/1953 | Gibb | 244/82 |
| 2,719,684 | 10/1955 | Peed, Jr. | 224/223 X |
| 2,721,716 | 10/1955 | Meredith | 244/228 |
| 2,817,483 | 12/1957 | Hill | 244/82 |
| 4,595,458 | 6/1986 | Robinson | 244/223 X |
| 4,765,572 | 8/1988 | Bellego et al. | 244/82 |

FOREIGN PATENT DOCUMENTS

| | | |
|---|---|---|
| 1 015 687 | 10/1952 | France . |
| 1025707 | 4/1966 | United Kingdom . |

OTHER PUBLICATIONS

French Search Report, 3 pages, dated Feb. 3, 1997.

*Primary Examiner*—Charles T. Jordan
*Assistant Examiner*—Christopher K. Montgomery
*Attorney, Agent, or Firm*—Marshall, O'Toole, Gerstein, Murray & Borun

[57] ABSTRACT

A system for controlling the tab (6) of an aircraft control surface (3) having a pair of position sensors (12 and 15) that supply information regarding the turning of the control surface (3) and the position of a jack (13), respectively, on the basis of signals generated by the sensors (12 and 15) as well as possibly on the basis of at least one parameter (p) originating from the aircraft, such as airspeed, positions of lift-augmenting devices, forces exerted by the pilot on a control, etc., and which formulates a command for the jack (13).

25 Claims, 7 Drawing Sheets

SYSTEM FOR CONTROLLING AN AIRCRAFT CONTROL SURFACE TAB

BACKGROUND OF THE INVENTION

The present invention relates to a system for controlling a tab for an aircraft control surface.

It is known that in airplanes with mechanical controls, without servocontrols, it is commonplace to provide a tab on some of the aerodynamic surfaces of said airplane, such as the rudder, the elevators, the ailerons, etc. for example. Such tabs are intended to alter the maneuvering forces that the pilot would have to exert on the aerodynamic surfaces in order to turn them if tabs were not present.

Many works set out the ways in which these devices with tabs (the common name for such compensation flaps) work, as well as the equations governing their operation, and allow their characteristics to be calculated as a function of the application to the specific case. Among the more recent works, "Airplane Flight Dynamics and Automatic Flight Controls" by J. ROSKAM, published in the United States by Roskam Aviation and Engineering Corporation, 1979, may be mentioned.

In known compensation systems of the automatic type:

a tab is articulated so that it can rotate on the trailing edge side of the associated aerodynamic surface, itself mounted so that it can rotate on the structure of said aircraft (wing, stabilizer, empennage, etc.);

the command (stick, wheel, rudder bar) available to the pilot of the aircraft is connected mechanically to said aerodynamic surface in such a way as to control the turning thereof with respect to said structure; and a mechanical linkage connects the tab to the structure in such a way that with each value of the angle through which said aerodynamic surface is turned with respect to the structure there corresponds, according to a determined relationship, a value of the angle through which the tab is turned with respect to said aerodynamic surface.

For the very reason that they are essentially mechanical, such known systems are unable to take account of all the parameters which would be needed to adapt the forces appropriately to all flight conditions. Their action cannot thus be optimum throughout the flight envelope and for any amount of turning whatever of the aerodynamic surface, because it necessarily has to come from a compromise. Some flight conditions, like those encountered if there was an engine breakdown or when rotating the airplane on takeoff, lead to the adoption of high levels of compensation in order to satisfy the regulations in force.

Moreover, the structural constraints during cruising flight at high speed will require a smaller amount of compensation, or even compensation in the other direction.

On the other hand, excessive compensation causes aerodynamic anomalies such as suction effects on the control surfaces for example.

In some cases, additional protection devices need to be introduced.

SUMMARY OF THE INVENTION

The main subject of the present invention is a tab control system based on the principle of tab devices of the deformable parallelogram type allowing numerous parameters which hitherto could not be incorporated into said systems to be taken into account.

To this end, according to the invention, the system for controlling an aircraft tab, of the type described hereinabove, is noteworthy in that it includes:

a first sensor detecting the value of the angle through which said aerodynamic surface is turned with respect to said structure;

a moving and controllable actuating member connected to said structure and capable of acting on said linkage to alter said determined relationship between the values of the angles through which said aerodynamic surface and said tab are turned;

a second sensor detecting the position of said actuating member; and a control device receiving information from said first and second sensors and, on the basis of this information, formulating a command for said actuating member.

Thus the turning of said tab can be adjusted to any desired value as a function of the turning of the said aerodynamic surface.

Said control device may advantageously in addition receive at least one parameter originating from said aircraft and take said parameter into account when formulating said command.

Said actuating member, which is mobile and controllable, may be a jack for example, it being possible for this member to be positioned either between said structure and said linkage in order to adjust the longitudinal position of an anchoring point thereof, or between two parts of said linkage in order to adjust the length of the latter.

It is readily understood that in either case the action of said actuating member alters the relationship between the angle through which the tab is turned and the angle through which said aerodynamic surface is turned.

Moreover, said parameters used in the control device may be of different types, such as a speed of the aircraft, information representing the position of the lift-augmenting devices, a force exerted by the pilot on the control, a load factor, an aircraft trim angle, an aerodynamic angle of attack, information representing a configuration of aircraft systems, the trim-release command, etc., for example.

The device for controlling said actuating member may be of two different types:

in the first, on the basis of the information delivered by said first sensor, said control device generates a datum value for the position of said actuating member, this datum value depending on said parameter, and said command for the actuating member is the error signal of the difference between said datum value and the information delivered by said second sensor;

in the second, on the basis of said parameter, said control device generates a datum value for the position of said aerodynamic surface and said command for the actuating member is the algebraic sum of the information from said second sensor and of said error signal of the difference between said datum value and the information delivered by said first sensor.

In an advantageous embodiment of the first type, said actuating member has a neutral position for which said relationship between the angles through which the tab and the aerodynamic surface are turned has a base value determined solely by the geometry of said mechanical linkage, said parameter sent to the control device is the airspeed of the aircraft, and, under the action of said control device, said actuating member adopts an operational position which depends on said airspeed and on the angle through which the aerodynamic surface is turned and for which said relationship adopts an operational value which differs from said base value.

A system in accordance with the invention and relating to the second type of control device recalled hereinabove advantageously includes a sensor for the forces exerted by the pilot on said control, and said parameter sent to the control device is the measurement of said forces as delivered by said sensor, said actuating member, under the action of said control device, adopting an operational position for which the turning of said tab with respect to said aerodynamic surface adjusts the turning of the latter to the value which corresponds to said measurement of the forces exerted by the pilot and a function of other parameters.

A system for steering the aerodynamic surface by controlling the position of said tab is thus obtained. In such a system the mechanical connection linking the control to the aerodynamic surface may possibly be dispensed with.

Moreover, in a system of this type it is possible to envisage using either said datum value for the position of the aerodynamic surface or some other information item representing an angle through which said aerodynamic surface is turned, in order to formulate the command for said actuating member.

Such an other information item may come, for example, from the automatic pilot installed on board the aircraft or alternatively be a safety signal when said datum value reaches a limiting value that must not be exceeded.

BRIEF DESCRIPTION OF THE DRAWINGS

The figures of the appended drawing will make it easy to understand how the invention may be embodied. In these figures, identical references denote similar elements.

DETAILED DESCRIPTION OF THE PREFERRED EMBODIMENTS

Figure 1:
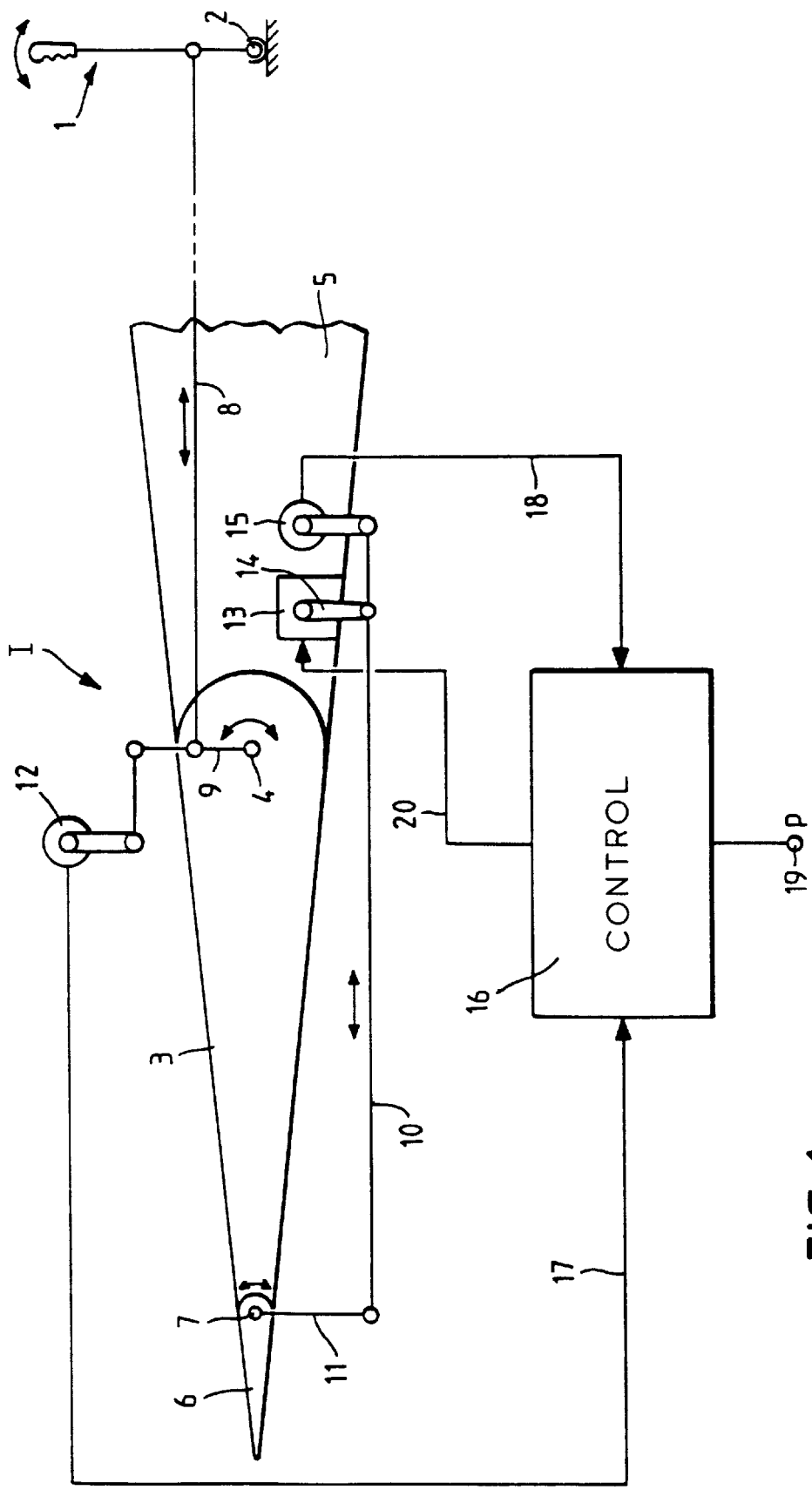
FIG. 1 is a block diagram of one embodiment of the control system in accordance with the present invention.

The embodiment I of the control system for an aircraft, shown in FIG. 1, includes, in a known way:

- a control 1, available to the pilot. Although in FIG. 1 the control has been represented diagrammatically in the form of a stick articulated at 2 to the structure of the aircraft, it is obvious that this control could be a rudder bar, a wheel, etc.;
- a controllable aerodynamic surface 3, for example a rudder, an elevator, an aileron, etc., mounted so that it can rotate about a shaft 4 on a part 5 of the structure of the aircraft, for example a wing, a stabilizer, an empennage, etc.;
- a compensating flap 6, often known as a tab, articulated so that it can rotate on the aerodynamic surface 3 about a shaft 7 arranged on the trailing edge side thereof;
- a first linkage 8 connecting said control 1 to a crank pin 9 integral with the shaft 4 in such a way that said aerodynamic surface 3 turns with the shaft 4 when the pilot actuates the control 1; and
- a second linkage 10 connecting said structure part 5 to a crank pin 11 integral with the shaft 7 so that said tab turns with the shaft 7 with respect to the aerodynamic surface 3 when the latter turns about its shaft 4. Thanks to this linkage 10, with each value of the angle through which the aerodynamic surface 3 is turned with respect to the structure part 5, about the axis of the shaft 4, there corresponds, according to a relationship determined by the geometric characteristics of the set-up, a value of the angle through which the tab 6 is turned with respect to the aerodynamic surface 3 about the axis of the shaft 7.

In accordance with the present invention, the control system I of FIG. 1 additionally includes:

- a first sensor 12, detecting the value of the angle through which the aerodynamic surface 3 is turned about the axis of the shaft 4 with respect to the structure part 5;
- a movable and controllable actuating member 13, for example a jack, mounted on the structure part 5 and capable of acting on the second linkage 10 in order to alter the determined relationship between the values of the angles through which said tab and said aerodynamic surface are turned. In FIG. 1, the second linkage 10 is assumed to be rigid and of fixed length and its opposite end to the tab 6 is connected to the structure part 5 via the movable member 14 of the actuating member 13, in such a way that the action of this actuating member causes a translational movement of said second linkage substantially parallel to itself. Thus the connection between the structure part 5 and the tab becomes variable, which means that said determined relationship between the angles through which the aerodynamic surface 3 and the tab 6 are turned, itself becomes variable. Furthermore, in FIG. 1 the jack has been represented as being of the rotary type. It is quite obvious that it could, as an alternative, be linear. In whichever form it is produced, the jack 13 is irreversible under the action of external forces when it is not being commanded. In a specific embodiment the jack 13 may be of the type having a neutral position which is adopted spontaneously by said jack in the absence of command, said neutral position in these conditions being irreversible;
- a second sensor 15 detecting the position of the movable member 14 of the actuating member 13; and
- a control device 16 receiving information originating from said first and second sensors 12 and 15 respectively via the connections 17 and 18 and which may have at least one input 19 for a parameter originating from the aircraft. As a function of said information from said sensors 12 and 15 and of said parameter, the control device 16 formulates a command which it sends to the actuating member 13 via the connection 20. Thus said actuating member 13 varies the longitudinal position of the second linkage 10 and thus alters the relationship between the angles through which the tab 6 and the aerodynamic surface 3 are turned.

Figure 2:
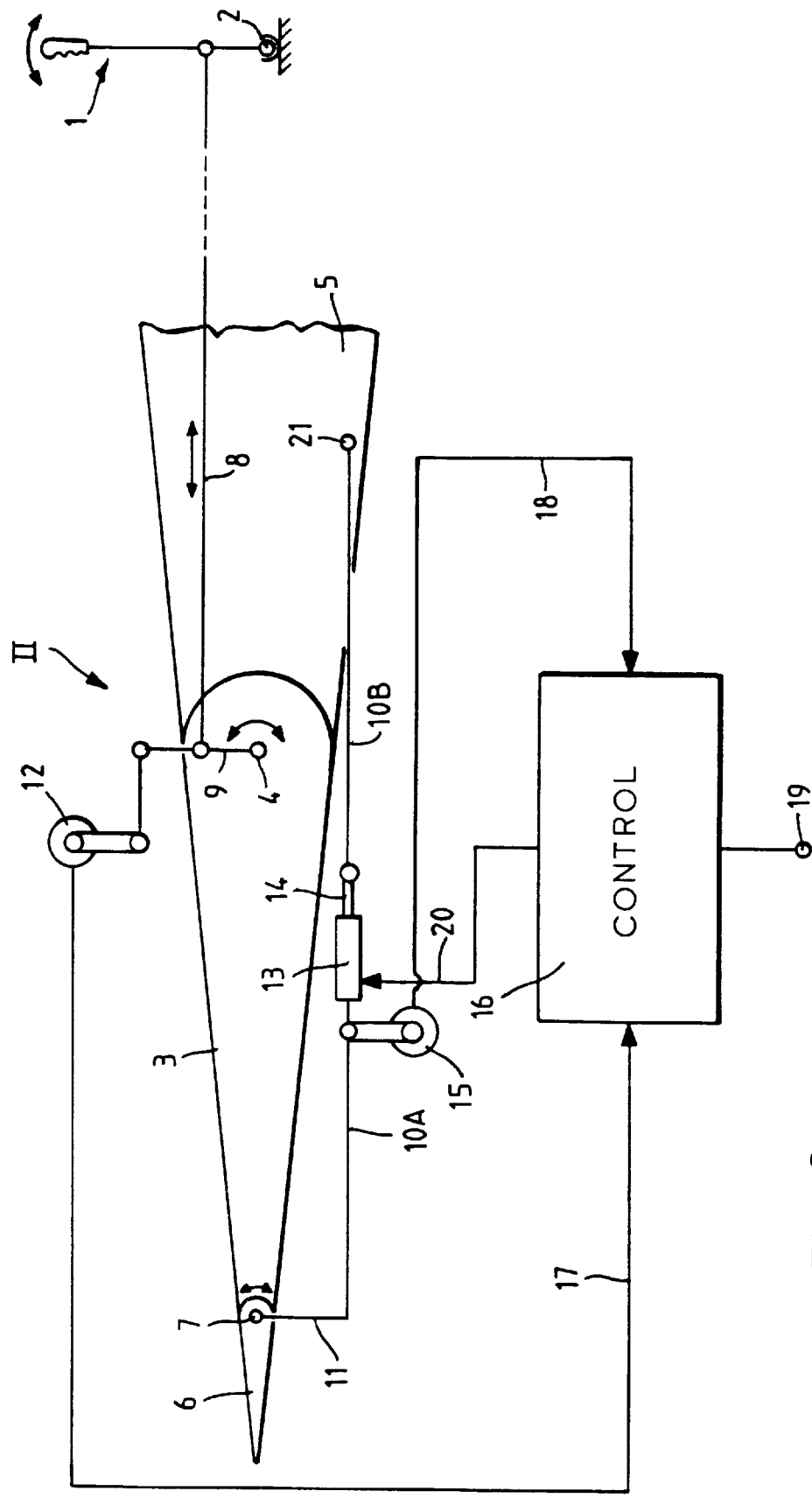
FIG. 2 diagrammatically illustrates a variation, regarding the actuator, on the system of FIG. 1, as far as the connection between the tab and the structure of the aircraft is concerned.

Embodiment II of the control system in accordance with the invention, as shown by FIG. 2, is very similar to embodiment I of FIG. 1. However, in this case, the second linkage 10 consists of two parts 10A and 10B which are joined together by the jack 13 (which in this case is advantageously linear) and whose ends on the opposite side to said jack 13 are respectively connected to the structure part 5 (at 21) and to the crank pin 11. Thus in this case the variation in the relationship between the angles through which the tab 6 and the aerodynamic surface 3 are turned is obtained by varying the length of the second linkage 10, rather than by a translational movement thereof as described with reference to FIG. 1.

For what has just been described with reference to FIGS. 1 and 2, it will be readily understood that when the actuating member 13 is inactive and in its neutral position, the relationship between the angle through which the tab 6 is turned about the shaft 7 and the angle through which the aerodynamic surface 3 is turned about the shaft 4 has a base value determined solely by the geometry of the system and the length of the second linkage 10.

By contrast, when the control device 16 makes the actuating member 13 active (via the connection 20) and makes it adopt an operational position which differs from the neutral position, said actuating member 13 displaces the linkage 10 in translation (FIG. 1) or alters the length of said linkage (FIG. 2). The result of this is that said relationship between the angles through which the tab 6 and the aerodynamic surface 3 are turned adopts an operational value which differs from said base value.

Thus, since the command sent to the actuating member 13 by the control device 16 is formulated as a function of information from the position sensors 12 and 15 and of parameters sent to the inputs 19, it can be seen that the control device 16 can establish laws for the turning of the tab 6 as a function of the turning of the aerodynamic surface 3 and can position said tab in such a way as to make it turn in a way which is a function of the flight conditions. Such laws governing the turning of the tab 6 may easily be established by calculation from a knowledge of the geometry of the device and using the equations of the mechanics of flight and may then be fine-tuned by flight trials and/or wind-tunnel testing. In addition, during testing it is possible, without mechanical modification and possibly during the same flight, to explore the entire range of values, particularly the degree of automaticness of said relationship in order to determine optimum values therefor, either for producing a conventional system, or for recording these values in the device 16.

Should the actuating member 13 break down, it will still be possible to fly the aircraft but with a fixed relationship between the angles through which the tab 6 and the aerodynamic surface 3 are turned.

Figure 3:
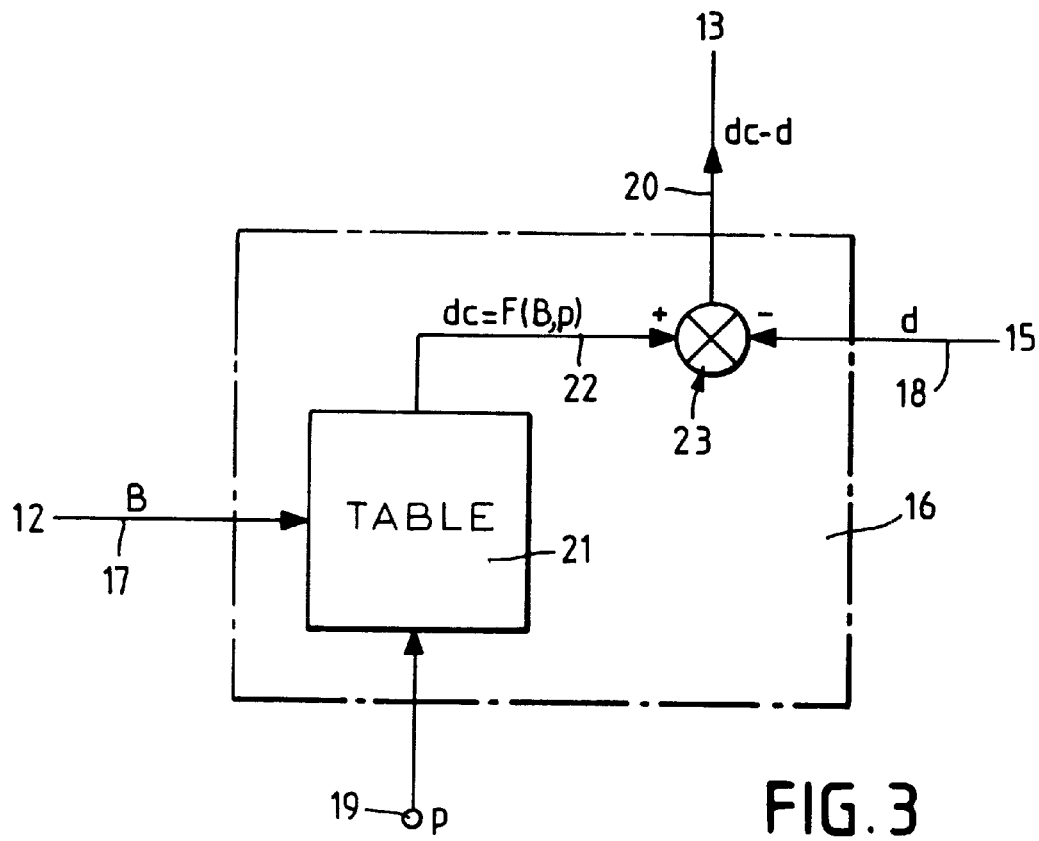
FIG. 3 shows a block diagram of one example of the device for controlling the jack in the systems of FIGS. 1 and 2.

FIG. 3 represents one embodiment of the control device 16 for the systems I and II of FIGS. 1 and 2. This embodiment includes:

a table 21 which, on the one hand receives a parameter p via one input 19, and receives the measurement of the angle B through which the aerodynamic surface 3 is turned about the axis 4, via the connection 17 and which, on the other hand, sends a datum value dc for the actuating member 13 on its output 22. This table 21, for each value of the turning angle B, gives a datum value dc which is a function F(B,p) of the turning angle B and the parameter p; and a subtracter 23 which on the one hand receives said datum value dc and, on the other hand, receives the actual position d of the movable member 14 as measured by the sensor 15 and sent to said subtracter 23 by the connection 18, and which sends the error signal dc-d to the actuating member 13 via the connection 20.

It can be seen that the device 16 of FIG. 3 thus slaves the position of the movable member 14 of the actuating member 13 to the datum position dc.

Let:

K1 be the base value of the relationship between the angles b and B, respectively, through which the tab 6 and the aerodynamic surface 3 are turned when the actuating member 13 is inactive and in the neutral position;

K2 be the ratio of the excursion of the tab 6 with respect to the displacement of the movable member 14 of the member 13, then the angle b through which the tab is turned is equal to $b=K1*B+K2*d.$ Since, furthermore, the position d of the movable member 14 is slaved to the datum position dc=F(B,p), the turning angle b adopts the value $K1*B+K2*F(B,p)$.

The parameter p may be of a different kind. In a specific example where the parameter p is the airspeed Vc (the value of which is available on board the aircraft), the datum value dc may be of the type $dc=K3*B$, in which expression K3 can vary as a function of the parameter Vc. The angle b through which the tab 6 is turned therefore adopts the value (give or take a constant)

$b=B*(K1+K2*K3)=B*K$ making $K=K1+K2*K3.$

Figure 4:
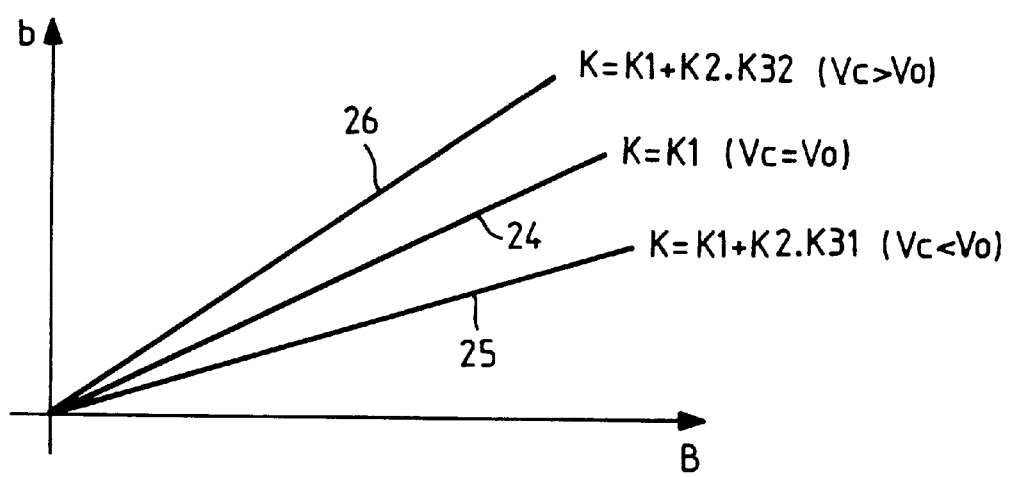
FIG. 4 gives a graphic illustration of one example of the relationship between the angles through which the tab and the aerodynamic surface are turned.

FIG. 4 illustrates a deliberately simplified example of a relationship between the turning angles b and B, assuming that K3 could only adopt the three fixed values 0, K31 and K32 as a function of the position of the airspeed Vc with respect to a speed threshold Vo:

if Vc=Vo, K3 is equal to 0 and K adopts the value K1, which means that with every angle B through which the aerodynamic surface 3 is turned there corresponds a turning angle b=K1*B. In this case, the movable member 14 is in its neutral position and the relationship between the turning angles b and B (see curve 24) has its base value determined solely by the geometry of the linkage 10;

if Vc<Vo, K3 adopts the fixed value K31 and K is equal to K1+K2*K31, which means that the movable member 14 adopts an operational position which is such that with every angle B through which the aerodynamic surface 3 is turned there corresponds a turning angle b=(K1+K2*K31).B for the tab 6. The relationship between the turning angles b and B therefore adopts an operational value which lies on the curve 25;

if Vc>Vo, K3 adopts the fixed value K32 and K is equal to K1+K2*K32, which means that the movable member 14 adopts an operational position which is such that with every angle B through which the aerodynamic surface 3 is turned there corresponds a turning angle b=(K1+K2*K32).B for the tab 6. The relationship between the turning angles b and B therefore adopts an operational value which lies on the curve 26.

In FIG. 4 it has been assumed that at low speed the operational values of the relationship between the turning angles b and B were lower than the base value, whereas at high speeds said operational values were higher than this base value. Depending on the aircraft, the opposite could be the case, the operational values corresponding to high speeds then being lower than the base value and those corresponding to low speeds being higher than this value.

What is more, instead of or in addition to using the airspeed Vc as the parameter p, it would be possible, for example, to use the position of lift-augmenting devices, in a similar way to what is described below with reference to FIGS. 6 and 7. In this case, the operational value of the relationship between the angles through which the tab 6 and the aerodynamic surface 3 are turned may be greater or smaller when said lift-augmenting devices are deployed than when they are retracted, depending on the type of aircraft.

In embodiment III of the system in accordance with the present invention, as illustrated by FIGS. 5 and 6, we again have the elements 1 to 15, 17, 18 and 20 described hereinabove with reference to FIGS. 1 and 2. However, in this embodiment III:

- the control device 16 of embodiments I and II has been replaced by a control device 27 which has inputs 28 and 34. The control device 27, like the control device 16, is connected to the sensors 12 and 15 and to the actuating member 13 by the connections 17, 18 and 20, respectively; and
- a force sensor 29 measuring the forces exerted directly on said aerodynamic surface 3 by the pilot is provided on the first linkage 8 between the control 1 and the aerodynamic surface 3 and this sensor sends these forces measured to the input 28 of the control device 27, via a connection 30.

Figure 6:
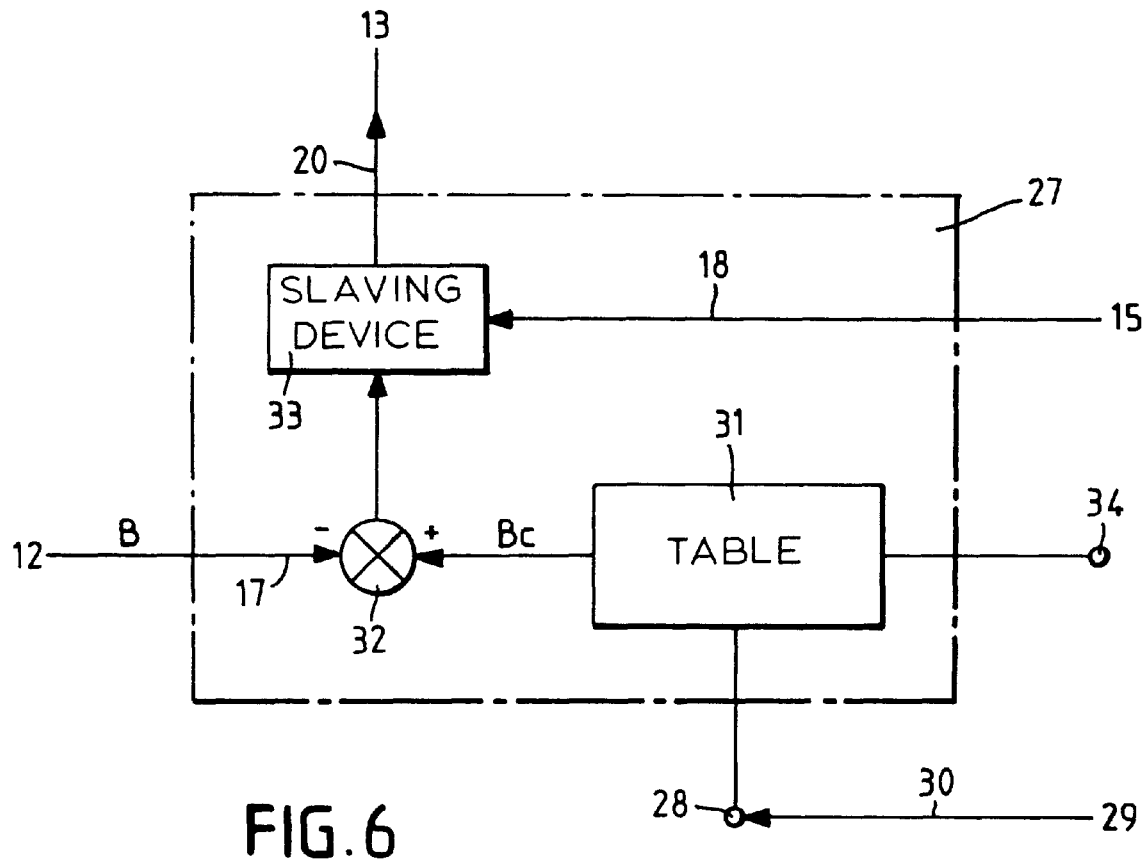
FIG. 6 shows a block diagram of one example of the control device for the system of FIG. 5.

As shown in FIG. 6, the control device 27 includes:

- a table 31 which is connected to the inputs 38 and 34 and which, for each forces value measured by the sensor 29 gives a corresponding datum value Bc for the turning of the aerodynamic surface 3. On its input 34, the table 31 receives the airspeed Vc available on board the aircraft;
- a subtracter 32 which receives on the one hand, said datum value Bc coming from table 31 and, on the other hand, the actual value of the turning angle B coming from the sensor 12, via the connection 17, and which generates an error signal; and
- a slaving device 33 which receives, on the one hand, said error signal coming from the subtracter 32 and, on the other hand, the value of the displacement d of the actuating member 13, coming from the sensor 15, via the connection 18 and which sends a command which corresponds to the algebraic sum of said value of the turning angle b and of said error signal to the actuating member 13 via the connection 20.

Figure 5:
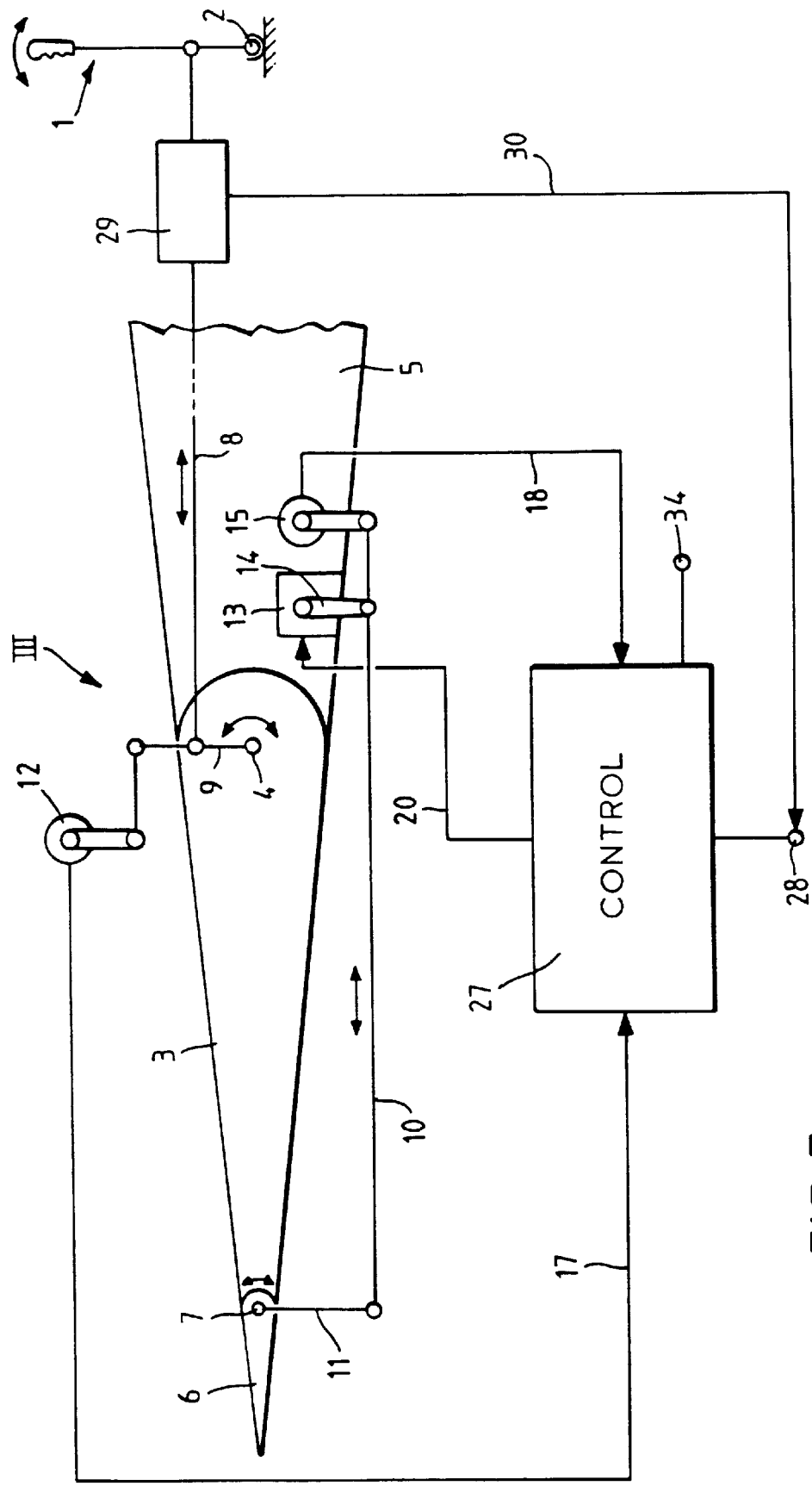
FIG. 5 is a block diagram of an alternative form of the systems of FIGS. 1 and 2, as far as the device for controlling the jack is concerned.

Thus the system III of FIGS. 5 and 6 makes it possible to produce a device in which the turning of the aerodynamic surface 3 is a function, for example a directly proportional function, of the forces exerted by the pilot. The error signal generated by the subtracter 32 is used to add to, or subtract from (in the slaving device 33) the turning angle B which is due to the geometry of the second linkage 10, the value which is necessary to satisfy the desired function. The tab 6 is therefore used to decrease and to increase aerodynamic forces, in order to slave the position of the control surface to the forces on the control in accordance with the desired law.

It is thus seen that the system III makes it possible:

- to alter, with optimizing, the pilot-generated control forces as a function of the flight conditions;
- to correct the anomalies of hinge moment, that is to say in particular to correct undesirable nonlinearities;
- to bring the aerodynamic surface 3 into the commanded position by slaving. In actual fact, when there are no forces, any movement which would tend to move the aerodynamic surface 3 away from its datum position leads to an action on the tab 6 to return it thereto. This in particular makes it possible automatically to counter aerodynamic anomalies such as suction effects on the control surface; and
- to keep mechanical control of the control surface in the event of a loss of the control aid, without there being a need for an engagement/disengagement device and without the parasitic forces such systems introduce.

In system III of FIGS. 5 and 6, as was stated hereinabove, the movable member 14 of the actuating member 13 is positioned as a function of the discrepancy between the datum position Bc, which is a function of the forces exerted by the pilot on the control 1, and the position B of the control surface, as detected by the sensor 12. This discrepancy is exploited by the control device 27 in order to command the member 13 in a direction determined by the sign of said discrepancy, until the error signal Bc-B is canceled.

Figure 7:
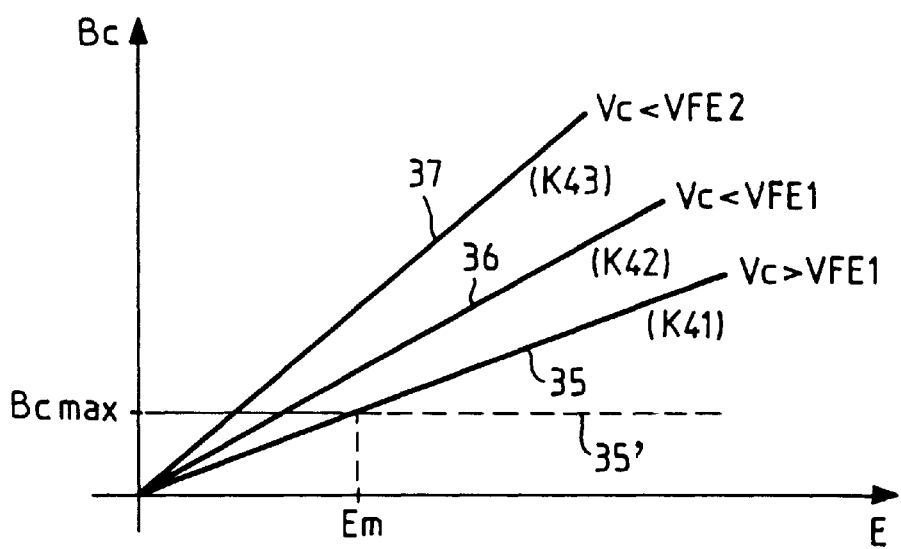
FIG. 7 gives a graphic illustration of one example of the operation of the control device of FIG. 6.

FIG. 7 illustrates one example of the formulation, by the table 31, of the turning datum Bc. In this example, which has deliberately been simplified, it has been assumed that the datum value Bc is proportional to the force E measured by the sensor 29, that is to say is of the type $Bc=K4*E$, $K4$ itself being a coefficient which can vary as a function of the flight conditions. In the example of FIG. 7, it has been assumed that the aircraft is equipped with lift-augmenting devices which can adopt three positions, for each of which there is a corresponding limiting speed that must not be exceeded, VFE. This figure reveals that:

- if the airspeed Vc is above a first value VFE1 of VFE corresponding to the position of maximum deployment of the lift-augmenting devices, the coefficient K4 adopts a value K41, the datum Bc being represented, as a function of the force E, by the curve 35. It will observed that the datum Bc may possibly be limited to a maximum value Bcmax (curve 35') beyond a value Em of the force E, at the limiting speed of VFE1;
- if the airspeed Vc is below said first value VFE1 of VFE, the lift-augmenting devices being in a position of intermediate deployment, the coefficient K4 adopts the value K42, the datum Bc being represented, as a function of the force E, by the curve 36;
- if the airspeed Vc is below a second value VFE2 of VFE, below the value VFE1 and corresponding to the retracted position of said lift-augmenting devices, the coefficient K4 adopts the value K43, the datum Bc being represented, as a function of the force E, by the curve 37.

The movable member 14 of the actuating member 13 may be controlled by slaving 33 to a speed proportional to the discrepancy Bc-B until it is canceled out, with a possible limitation on the maximum speed. As an alternative, the slaving device 33 may include an integrator, the input of which receives said discrepancy and the output of which represents the position command for the movable member 14. Here too, it is possible to envisage a limitation on the maximum speed of displacement of the movable member 14. This is a classic problem in slaving control, where the error has to be minimized and stability guaranteed through the operating range of the system.

It can thus be seen that in the system III of FIG. 5, when the pilot acts on the control 1, the aerodynamic surface 3 pivots about the axis of the shaft 4 under the action of the first linkage 8 and the angle through which said aerodynamic surface is turned is adjusted by slaving to the value Bc thanks to the turning of the tab 6.

Figure 8:
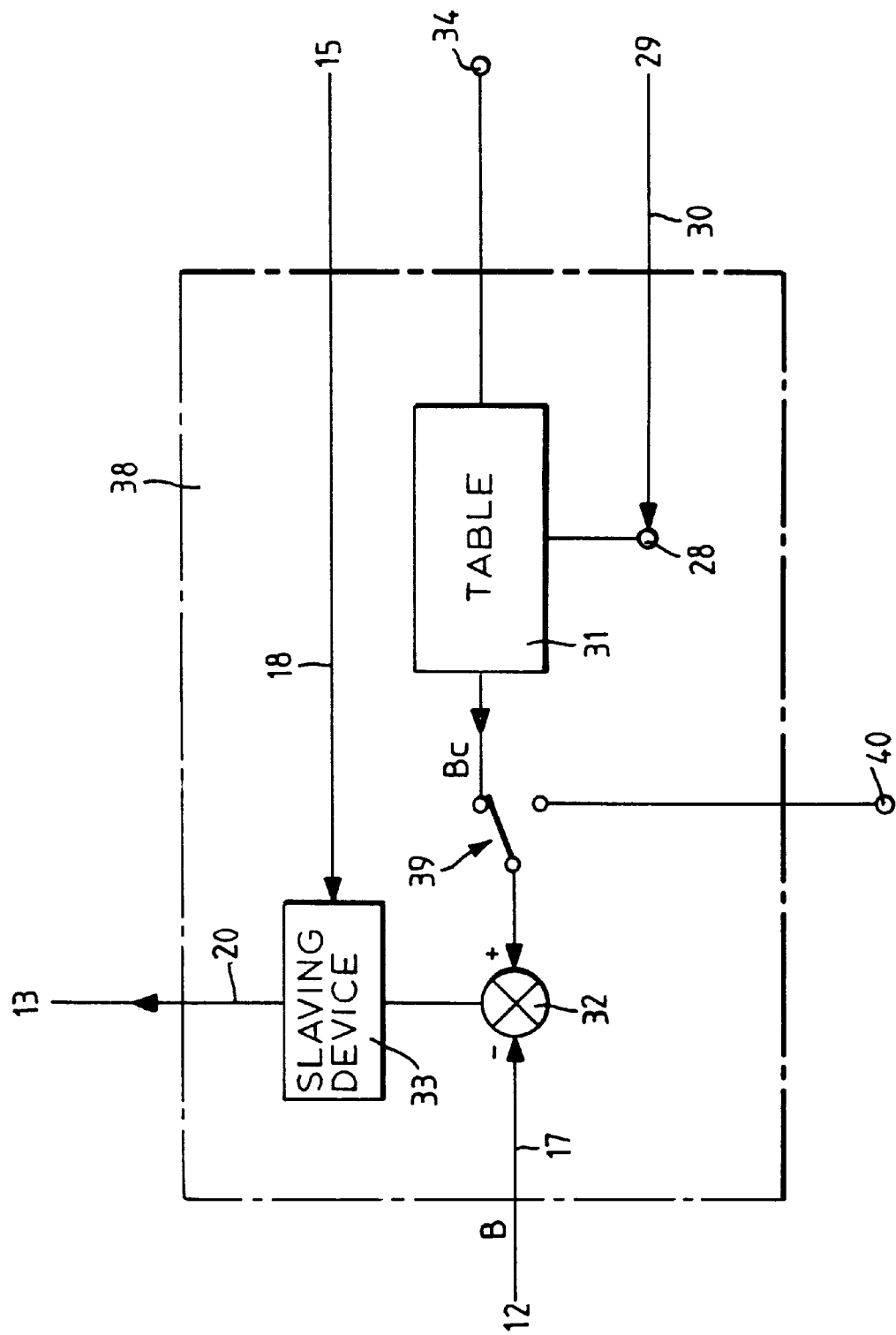
FIG. 8 is a block diagram of an alternative form of the control device of FIG. 6.

FIG. 8 represents an alternative form 38 of the control device 27. Here, we again find the various elements 17, 18, 20, 28 and 30 to 34. The control device 38 additionally includes a switch 39 inserted between the table 31 and the subtracter 32 and capable of connecting either the output of the table 31, or a terminal 40 to said subtracter 32.

The aerodynamic-surface turn signal from an automatic pilot (not represented) installed on board the aircraft may be applied to the terminal 40. Thus when the switch 39 occupies the appropriate position, the system in accordance with the invention acts as a servomotor for the automatic pilot.

As an alternative, in the case where the aerodynamic surface 3 is an elevator, a nose-down signal may be applied to the terminal 40, the switch 39 automatically moving from its position for which it connects the table 31 to the subtracter 32 to its position for which it connects the latter to the terminal 37, when the angle of incidence of the aircraft exceeds a given threshold. Thus incidence protection is obtained. In this case, the switch 39 may be actuated by the signal from an incidence sensor.

Figure 9:
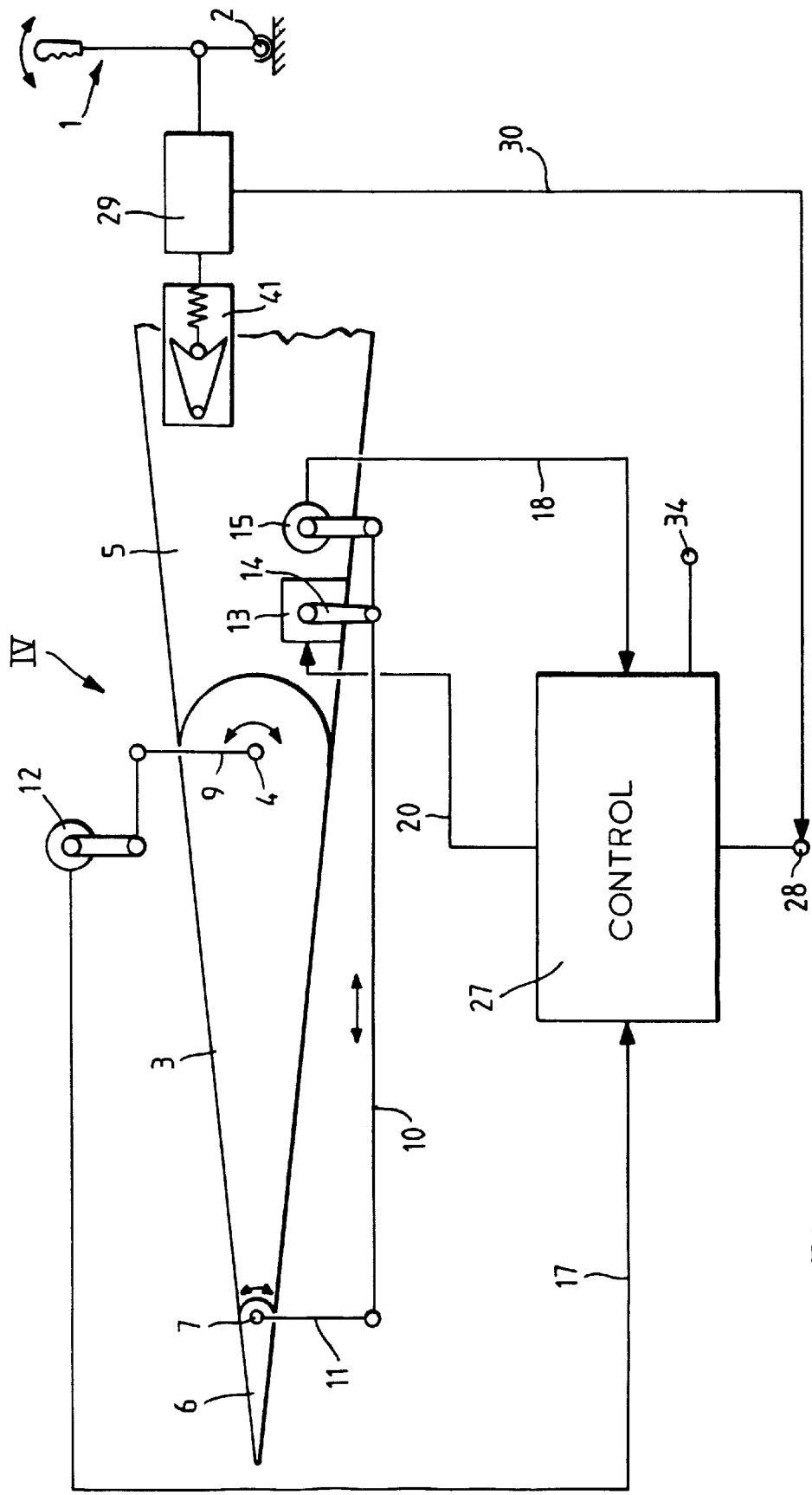
FIG. 9 shows a block diagram of a variation of the system of FIG. 5.

As shown in FIG. 9, the linkage 8 may even be dispensed with. In embodiment IV of this FIG. 9, the linkage 8 has been dispensed with and replaced by an "artificial feel" device 41, capable, solely as regards the forces to be exerted by the pilot, of fulfilling the same function.

In this case, the force sensor may be replaced by a position sensor which will directly give the drive command to be transmitted to the input 28.

We claim:

1. A system for controlling a tab (6) of an aircraft, said tab (6) being articulated so that said tab (6) can rotate on a trailing edge side of an aerodynamic surface (3) of said aircraft, said aerodynamic surface (3) being mounted to rotate on a structure (5) of said aircraft, said aircraft having a control device (1) adapted to be controlled by a pilot of said aircraft, said control device (1) being mechanically connected to said aerodynamic surface (3) so as to be capable of turning said aerodynamic surface (3), said aircraft having a mechanical linkage (10) that connects said tab (6) to said aircraft structure (5) so that for each angle through which said aerodynamic surface (3) is turned with respect to said aircraft structure (5) there corresponds, according to a determined relationship, a value of an angle through which said tab (6) is turned with respect to said aerodynamic surface (3), said system comprising:

a first sensor (12) that detects an angle through which said aerodynamic surface (3) is turned with respect to said aircraft structure (5);

a movable and controllable actuating member (13) connected to said aircraft structure (5), said actuating member being capable of acting on said mechanical linkage (10) to alter said determined relationship between said values of said angles through which said aerodynamic surface (3) and said tab (6) are turned;

a second sensor (15) that detects the position of said actuating member (13); and a control device (16, 27) that receives information from said first and second sensors and, on the basis of said information, formulates a command for said actuating member (13).

2. The system as claimed in claim 1, wherein said control device (16, 27) additionally receives a signal indicative of a parameter (p) relating to said aircraft and takes said parameter into account when formulating said command.

3. The system as claimed in claim 2, wherein, on the basis of information delivered by said first sensor (12), said control device (16) generates a datum value (dc) for a position (d) of said actuating member (13), said datum value depending on said parameter (p), and wherein said command for said actuating member (13) comprises an error signal representing a difference between said datum value (dc) and information delivered by said second sensor (15).

4. The system as claimed in claim 3, wherein said datum value (dc) for said position of said actuating member (13) depends on the airspeed of said aircraft.

5. The system as claimed in claim 4, wherein said actuating member (13) has a neutral position for which said relationship between said angles through which said tab (6) and said aerodynamic surface (3) are turned has a base value determined solely by a geometry of said mechanical linkage (10), wherein said parameter (p) comprises the airspeed of said aircraft, and wherein, under the action of said control device (16), said actuating member (13) adopts an operational position which depends on said airspeed and on the angle through which said aerodynamic surface (3) is turned and for which said relationship adopts an operational value which differs from said base value.

6. The system as claimed in claim 5, wherein at low airspeeds said operational value is higher than said base value and wherein at high airspeeds said operational value is lower than said base value.

7. The system as claimed in claim 5, wherein at low airspeeds said operational value is lower than said base value and wherein at high airspeeds said operational value is higher than said base value.

8. The system as claimed in claim 2 wherein said aircraft includes lift-augmenting devices, wherein said parameter (p) comprises information representing the position of said lift-augmenting devices, and wherein under the action of said control device said actuating member (13) adopts an operational position which depends on the position of said lift-augmenting devices.

9. The system as claimed in claim 8, wherein a value of the relationship between the angles through which said tab (6) and said aerodynamic surface (3) are turned is greater when said lift-augmenting devices are deployed than when said lift-augmenting devices are retracted.

10. The system as claimed in claim 8, wherein a value of the relationship between the angles through which said tab (6) and said aerodynamic surface (3) are turned is smaller when said lift-augmenting devices are deployed than when said lift-augmenting devices are retracted.

11. The system as claimed in claim 2, wherein on the basis of said parameter, said control device (27) generates a datum value (Bc) for a position of said aerodynamic surface (3) and wherein said command for said actuating member (13) comprises the algebraic sum of information from said second sensor (15) and an error signal of the difference between said datum value (Bc) and information delivered by said first sensor (12).

12. The system as claimed in claim 11, wherein said parameter comprises a force (E) applied by the pilot to said control device (1).

13. The system as claimed in claim 11, wherein said datum value (Bc) comprises a function of the airspeed of said aircraft.

14. The system as claimed in claim 11, additionally comprising a sensor (29) that detects a force (E) exerted by a pilot on said control device (1), wherein said parameter sent to said control device comprises a measurement of said force (E), and wherein under the action of said control device (27), said actuating member (13) adopts an operational position for which the turning of said tab (6) with respect to said aerodynamic surface (3) adjusts the turning of said aerodynamic surface (3) to a value which corresponds to said measurement of said force (E) exerted by the pilot.

15. The system as claimed in claim 14, wherein adjustment of the turning of said aerodynamic surface (3) is such that the angle through which said aerodynamic surface is turned is proportional to said pilot-exerted force (E).

16. The system as claimed in claim 14, wherein adjustment of the turning of said aerodynamic surface (3) is such that the ratio of an angle through which said aerodynamic surface (3) is turned to said pilot-exerted force (E) is a function of the airspeed of said aircraft.

17. The system as claimed in claim 16, wherein adjustment of the turning of said aerodynamic surface (3) is such that the ratio of an angle through which said aerodynamic surface (3) is turned to said pilot-exerted force (E) decreases when the airspeed increases.

18. The system as claimed in claim 14, wherein said aircraft has lift-augmenting devices and wherein adjustment of the turning of said aerodynamic surface (3) is such that the ratio of the turning of said aerodynamic surface (3) to said pilot-exerted force (E) depends on the position of said lift-augmenting devices.

19. The system as claimed in claim 18, wherein adjustment of the turning of said aerodynamic surface (3) is such that the ratio of an angle through which said aerodynamic surface (3) is turned to said pilot-exerted force (E) is greater when said lift-augmenting devices are deployed than when said lift-augmenting devices are retracted.

20. The system as claimed in claim 11 additionally comprising:
   a subtracter (32) which, in order to generate said error signal, receives information delivered by said first sensor (12) on a first input and receives said datum value (Bc) on a second input; and
   a switch (39) connected to said second input so that said switch can send to said subtracter (32) either said datum value (Bc) or angle information representing an angle through which said aerodynamic surface (3) is turned.

21. The system as claimed in claim 20 for an aircraft which has an automatic pilot, wherein said angle information comprises a command from said automatic pilot to turn the aerodynamic surface (3) through an angle.

22. The system as claimed in claim 20, in which said aerodynamic surface comprises an elevator, wherein said angle information comprises a nose-down signal when the angle of incidence of said elevator reaches a safety limit which must not be exceeded and wherein said switch (39) is commanded automatically to make said switch (39) send said angle information to said subtracter (32) when said datum value (Bc) exceeds said safety limit.

23. The system as claimed in claim 1, wherein said actuating member (13) comprises a jack insert ed between two parts (10A, 10B) of said mechanical linkage (10) in order to give said mechanical linkage a variable length.

24. The system as claimed in claim 1, wherein said actuating member comprises a jack (13) inserted between said structure (5) and said linkage (10).

25. A system for controlling an aircraft tab (6), said tab (6) being articulated so that said tab can rotate on a trailing edge side of an aerodynamic surface (3) of said aircraft, said aerodynamic surface (3) being mounted to rotate on a structure (5) of said aircraft, said aircraft having a control device (1) adapted to be controlled by a pilot of said aircraft in order to control the turning of said aerodynamic surface (3) with respect to said structure (5), said aircraft having a mechanical linkage (10) that connects said tab (6) to said structure (5) so that for each angle through which said aerodynamic surface (3) is turned with respect to said structure (5) there corresponds, according to a determined relationship, a value of an angle through which said tab (6) is turned with respect to said aerodynamic surface (3), wherein there is no mechanical link between said control device (1) and said aerodynamic surface (3), said system comprising:
   a first sensor (12) that detects an angle through which said aerodynamic surface (3) is turned with respect to said structure (5);
   a movable and controllable actuating member (13) connected to said structure (5), said actuating member (13) being capable of acting on said mechanical linkage (10) to alter said determined relationship between said values of said angles through which said aerodynamic surface (3) and said tab (6) are turned;
   a second sensor (15) that detects the position of said actuating member (13);
   a third sensor (29) connected to said control device (1) that generates a measurement; and
   a control device (27) that receives information from said first, second and third sensors and, on the basis of said information, formulates a command for said actuating member (13) so that said actuating member (13) adopts an operational position for which the turning of said tab (6) with respect to said aerodynamic surface (3) adjusts the turning of the said aerodynamic surface (3) to a value which corresponds to said measurement generated by said third sensor (29).

* * * * *